Feb. 7, 1967 J. FAWCETT ETAL 3,302,958
BUMPER ATTACHMENT FOR PUSHING VEHICLES
Filed March 8, 1965
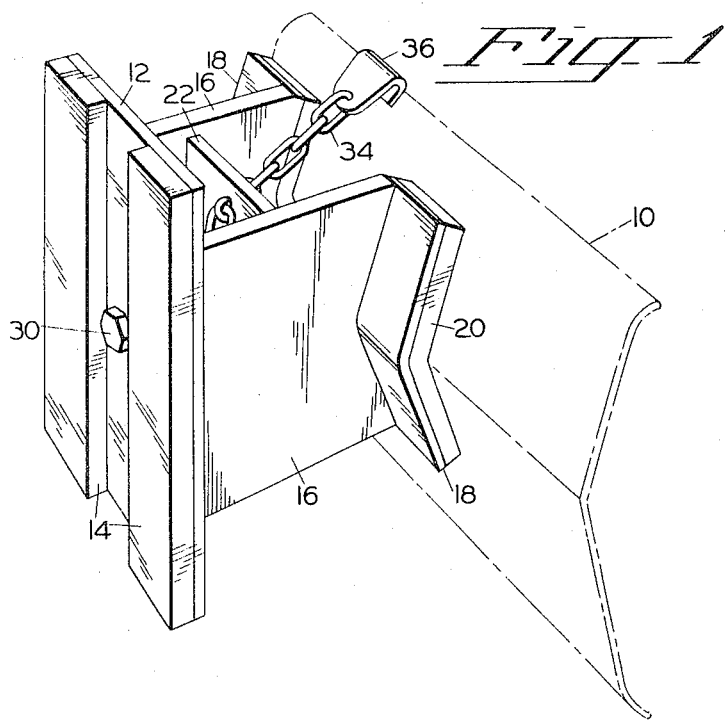
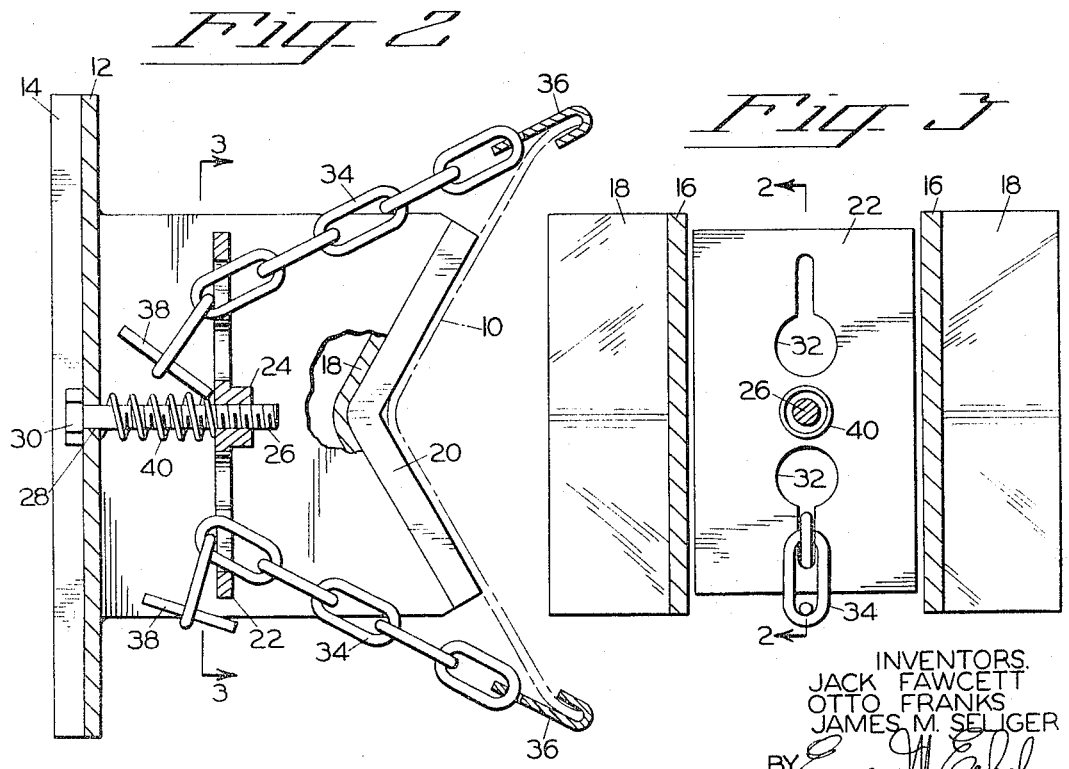
INVENTORS.
JACK FAWCETT
OTTO FRANKS
JAMES M. SELIGER
BY Eugene M. Eckelman
ATTORNEY ða # United States Patent Office 3,302,958
Patented Feb. 7, 1967

3,302,958
BUMPER ATTACHMENT FOR PUSHING VEHICLES
Jack Fawcett, 8415 SE. 17th Ave., Portland, Oreg. 97202; Otto Franks, Portland, Oreg. (5237 SW. Washington, Lake Grove, Oreg. 97034); and James M. Seliger, 303 SE. 172nd, Portland, Oreg. 97233
Filed Mar. 8, 1965, Ser. No. 437,818
4 Claims. (Cl. 280—481)

The present invention relates to a bumper attachment for vehicles wherein one automotive vehicle may push another.

It is often desirable or necessary for one automotive vehicle to push another such as when a vehicle is stalled or it is otherwise desired to move a vehicle not capable of operating under its own power. Present automobiles, however, by their construction are not capable of pushing others since the bumpers of the various makes and models are not matched in height or shape and furthermore the grill and tail assemblies are shaped such that they are capable of being easily damaged in a vehicle pushing function.

It is accordingly a primary objective of the present invention to provide an attachment arranged to be mounted on a bumper of an automotive vehicle and having a forward pushing surface capable of engaging the bumper of another vehicle to establish an effective and damage-proof pushing engagement.

Another object is to provide an attachment for bumpers of the type described which may be readily mounted on and demounted from substantially all existing shapes and sizes of bumpers.

Still another object is to provide an attachment for bumpers which is simplified in construction and which is capable of pushing against any type of bumper.

Briefly stated, the invention comprises a bumper attachment employing a front pushing face plate having a pair of rearwardly extending bracket arms contoured at the rearward end thereof for having mounting engagement against the bumper of a vehicle on which it is to be mounted. Slidably disposed between the bracket arms for longitudinal movement relative to the attachment is a draw plate to which is connected a pair of flexible links. These links terminate at their free ends in hooks arranged to hook over top and bottom edges of the bumper and also arranged to hold the attachment on the bumper by suitable retraction of the draw plate.

The invention will be better understood and additional objects will become apparent from the following specification and claims, considered together with the accompanying drawings, wherein the numerals of reference indicate like parts.

In the drawings:

FIGURE 1 is a perspective view of the present attachment as applied to an automobile bumper, a fragment of a bumper being shown in phantom line;

FIGURE 2 is a central, vertical, sectional view of the attachment taken on the line 2—2 of FIGURE 3; and FIGURE 3 is a transverse vertical sectional view taken on the line 3—3 of FIGURE 2.

Referring now in particular to the drawings the numeral 10 designates generally a bumper of conventional design. Such bumpers take various cross sectional shapes, some of which are angularly shaped as shown. While such bumpers are attractive in appearance they do not facilitate bumper to bumper pushing of other vehicles since said bumpers are apt to slide over or under an engaging bumper and cause damage to the vehicle being pushed as well as the pushing vehicle.

The attachment of the present invention is arranged for mounting engagement with a bumper 10, and comprises a pushing face plate 12 which is of a selected height to extend to upper and lower planes whereby it is capable of safely abutting against all types of bumpers without the possibility of riding over or under said bumpers. The front surface of the face plate 12 has resilient strips 14 secured thereto in any suitable manner such as by riveting, surface gluing, or the like. The resilient strips permit a pushing engagement with a bumper without the possibility of marring the latter.

Integrated with the face plate 12 is a pair of bracket arms 16 disposed in rearwardly extending, parallel disposition and having laterally disposed end portions 18. The end portions 18 of the bracket arms are inwardly contoured to correspond substantially to the outwardly angled contour of the bumper 10. It is to be understood that the rear surface shape of the end portions 18 may vary, but the shape shown will have suitable engagement with any type of bumper whether such bumper has an angled front surface as shown, a flat front surface, a rounded surface, or other shape. The end portions 18, similar to face plate 12, have resilient strips 20 secured on their rearward surface.

Slidably disposed between the bracket arms 16 is a vertically draw plate 22 having a central, internally threaded boss portion 24 threadedly receiving a screw 26. Screw 26 passes freely through a bore 28 in the base plate 12 and has a head 30 larger than the bore 28 whereby upon rotation of the screw draw plate 22 is adapted to be moved longitudinally relative to the base plate.

Draw plate 22 has a pair of vertically spaced bayonet slots 32. Adapted to be connected in these slots is a pair of flexible links in the form of chains 34. Each of the chains has hook members 36 secured to its outer ends adapted to hook over the top and bottom edges of a bumper 10. The ends of the chains opposite from the hook members have integral cross pins 38 which serve to prevent accidental disengagement of the chains 34 from the draw plate. That is, while the chains can be removed if desired by suitable manipulation of the cross pins relative to the bayonet slots, ordinarily these pins will lock behind the plates and prevent accidental disengagement of the chains when the latter are hanging loose. A compression spring 40 is mounted on the screw 26 between the draw plate 22 and the face plate 12 to hold the draw plate and the screw in a non-rattling position when the device is not secured to a bumper.

The present attachment is mounted on a bumper by first advancing the draw plate 22 toward the rearward end of attachment. This is accomplished by rotation of the screw 30 in the proper direction. The chains 34 are then adjusted in length, by engaging selected links thereof in slots 32, so that after engaging the hooks 36 over the upper and lower edges of the bumper the draw plate is capable of tightening the chains by a retracting drive movement thereof. The screw 30 is then rotated in the opposite direction to accomplish the said retracting movement of the draw plate whereby to hold the attachment on the bumper, the rear portion of the attachment being adjusted so that its contour fits in a best manner possible the contour of the bumper on which it is mounted. The head 30 of the secrew 26 is of a shape and size to be operated by the conventional wheel lug wrench ordinarily carried in the vehicle.

Thus, the present invention is capable of providing a pushing attachment between vehicles to eliminate damage to the vehicles. It is of simplified construction and is easily and rapidly mounted and demounted with relation to a vehicle. The bracket arms 16 are of a length to provide a safe bumper to bumper clearance of the vehicles whereby there is no possibility of engagement of grill and tail assemblies of said vehicles.

It is to be understood that the form of our invention herein shown and described is to be taken as a preferred example of the same and that various changes in the shape, size and arrangement of parts may be resorted to without departing from the spirit of our invention or the scope of the subjoined claims.

Having thus described our invention, we claim:

1. A bumper attachment for pushing vehicles comprising a face plate, a pair of bracket arms integrated with said face and extending rearwardly therefrom, bumper engaging means on the rearward end of said bracket arms for fitting against a vehicle bumper on which the said attachment is to be mounted, a draw plate movably disposed between said bracket arms, link means connected to said draw plate and arranged to be releasably attached to a bumper whereby the pushing face thereof is capable of having pushing engagement with the bumper of another vehicle, and drive means on the attachment connected to said draw plate for driving the latter away from the bumper so that said link means mounts the attachment thereon.

2. The bumper attachment of claim 1 wherein said link means includes a pair of chains having hook end portions arranged to engage over the top and bottom edges of a bumper on which the attachment is to be mounted, the connection between said draw plate and said chains comprising an adjustable length connection for varying the length of the chains.

3. A bumper attachment for pushing vehicles comprising a face plate, a pair of bracket arms integrated with said face and extending rearwardly therefrom, bumper engaging means on the rearward end of said bracket arms for fitting against a vehicle bumper on which the said attachment is to be mounted, a draw plate slidably mounted between said bracket arms, link means connected to said draw plate and arranged to be releasably attached to a bumper for holding said attachment thereon whereby the pushing face thereof is capable of having pushing engagement with the bumper of another vehicle, and screw means for slidably moving said draw plate relative to the attachment for mounting and demounting the latter with relation to a bumper.

4. The bumper attachment of claim 3 wherein said link means includes a pair of chains having hook end portions arranged to engage over the top and bottom edges of a bumper on which the attachment is to be mounted.

References Cited by the Examiner

UNITED STATES PATENTS

| | | | |
|---|---|---|---|
| 2,338,934 | 1/1944 | Gross | 280—33 |
| 2,458,667 | 1/1949 | Williams | 280—502 |
| 2,587,208 | 2/1952 | Peterson | 280—481 X |
| 2,679,405 | 5/1954 | Snyder | 280—481 |
| 2,772,099 | 11/1956 | Smith | 280—502 |
| 2,999,697 | 9/1961 | Winget | 280—481 |
| 3,198,552 | 8/1965 | Hopkins | 280—502 |
| 3,233,917 | 2/1966 | Lindsey et al. | 280—502 |

LEO FRIAGLIA, *Primary Examiner.*